US007499104B2

United States Patent
Cooper

(10) Patent No.: US 7,499,104 B2
(45) Date of Patent: *Mar. 3, 2009

(54) METHOD AND APPARATUS FOR DETERMINING RELATIVE TIMING OF IMAGE AND ASSOCIATED INFORMATION

(75) Inventor: J. Carl Cooper, Incline Village, NV (US)

(73) Assignee: Pixel Instruments Corporation, Los Gatos, CA (US)

( * ) Notice: Subject to any disclaimer, the term of this patent is extended or adjusted under 35 U.S.C. 154(b) by 461 days.

This patent is subject to a terminal disclaimer.

(21) Appl. No.: 10/846,133

(22) Filed: May 14, 2004

(65) Prior Publication Data

US 2004/0227856 A1      Nov. 18, 2004

Related U.S. Application Data

(60) Provisional application No. 60/471,176, filed on May 16, 2003.

(51) Int. Cl.
*H04N 9/475* (2006.01)
(52) U.S. Cl. ..................... 348/512; 348/515; 348/518; 348/571
(58) Field of Classification Search ................ 348/515, 348/512, 441, 461, 480, 516–518, 519, 571, 348/575, 722, 738, 699–700, 576; 382/118, 382/190; H04N 9/475
See application file for complete search history.

(56) References Cited

U.S. PATENT DOCUMENTS

| | | | | | |
|---|---|---|---|---|---|
| 4,975,960 A | * | 12/1990 | Petajan | ...................... | 704/251 |
| 5,387,943 A | * | 2/1995 | Silver | ......................... | 348/512 |
| 5,572,261 A | * | 11/1996 | Cooper | ...................... | 348/512 |
| 5,880,788 A | * | 3/1999 | Bregler | ...................... | 348/515 |
| 6,067,378 A | * | 5/2000 | Lee | ............................ | 382/203 |
| 6,675,174 B1 | * | 1/2004 | Bolle et al. | .............. | 707/104.1 |
| 6,829,018 B2 | * | 12/2004 | Lin et al. | .................... | 348/738 |
| 7,142,250 B1 | * | 11/2006 | Black | ......................... | 348/515 |
| 2005/0254584 A1 | * | 11/2005 | Kim et al. | ............. | 375/240.27 |
| 2006/0206243 A1 | * | 9/2006 | Pawlicki et al. | ................ | 701/1 |
| 2007/0109423 A1 | * | 5/2007 | Kohashi et al. | .......... | 348/223.1 |

* cited by examiner

*Primary Examiner*—Trang U Tran
(74) *Attorney, Agent, or Firm*—Stevens Law Group

(57) ABSTRACT

Measurement of the relative timing between images and associated information, for example video and audio. Image mutual event characteristics are recognized in the images and associated mutual event characteristics are recognized in the associated information. The image mutual events and associated mutual events are compared to determine their occurrences, one relative to the other as a measure of relative timing. Particular operation with audio and video signals is described.

26 Claims, 17 Drawing Sheets

US 7,499,104 B2

METHOD AND APPARATUS FOR DETERMINING RELATIVE TIMING OF IMAGE AND ASSOCIATED INFORMATION

CROSS REFERENCE TO RELATED APPLICATION

This application claims the benefit of U.S. Provisional Application Ser. No. 60/471,176, filed on May 16, 2003.

BACKGROUND OF INVENTION

1. Field of the Invention

The invention relates to the creation, manipulation, transmission, storage, etc. and especially synchronization of multi-media entertainment, educational and other programming having at least video and associated information.

2. Background Art

The creation, manipulation, transmission, storage, etc. of multi-media entertainment, educational and other programming having at least video and associated information requires synchronization. Typical examples of such programming are television and movie programs. Often these programs include a visual or video portion, an audible or audio portion, and may also include one or more various data type portions. Typical data type portions include closed captioning, narrative descriptions for the blind, additional program information data such as web sites and further information directives and various metadata included in compressed (such as for example MPEG and JPEG) systems.

Often the video and associated signal programs are produced, operated on, stored or conveyed in a manner such that the synchronization of various ones of the aforementioned audio, video and/or data is affected. For example the synchronization of audio and video, commonly known as lip sync, may be askew when the program is produced. If the program is produced with correct lip sync, that timing may be upset by subsequent operations, for example such as processing, storing or transmission of the program.

One aspect of multi-media programming is maintaining audio and video synchronization in audio-visual presentations, such as television programs, for example to prevent annoyances to the viewers, to facilitate further operations with the program or to facilitate analysis of the program. Various approaches to this challenge are described in commonly assigned, issued patents. U.S. Pat. No. 4,313,135, U.S. Pat. No. 4,665,431; U.S. Pat. No. 4,703,355; U.S. Pat. Re. 33,535; U.S. Pat. No. 5,202,761; U.S. Pat. No. 5,530,483; U.S. Pat. No. 5,550,594; U.S. Pat. No. 5,572,261; U.S. Pat. No. 5,675,388; U.S. Pat. No. 5,751,368; U.S. Pat. No. 5,920,842; U.S. Pat. No. 5,946,049; U.S. Pat. No. 6,098,046; U.S. Pat. No. 6,141,057; U.S. Pat. No. 6,330,033; U.S. Pat. No. 6,351,281; U.S. Pat. No. 6,392,707; U.S. Pat. No. 6,421,636 and U.S. Pat. No. 6,469,741. Generally these patents deal with detecting, maintaining and correcting lip sync and other types of video and related signal synchronization.

U.S. Pat. No. 5,572,261 describes the use of actual mouth images in the video signal to predict what syllables are being spoken and compare that information to sounds in the associated audio signal to measure the relative synchronization. Unfortunately when there are no images of the mouth, there is no ability to determine which syllables are being spoken.

As another example, in systems where the ability to measure the relation between audio and video portions of programs, an audio signal may correspond to one or more of a plurality of video signals, and it is desired to determine which. For example in a television studio where each of three speakers wears a microphone and each actor has a corresponding camera which takes images of the speaker, it is desirable to correlate the audio programming to the video signals from the cameras. One use of such correlation is to automatically select (for transmission or recording) the camera which televises the actor which is currently speaking. As another example when a particular camera is selected it is useful to select the audio corresponding to that video signal. In yet another example, it is useful to inspect an output video signal, and determine which of a group of video signals it corresponds to thereby facilitating automatic selection or timing of the corresponding audio. Commonly assigned patents describing these types of systems are described in U.S. Pat. Nos. 5,530,483 and 5,751,368.

The above patents are incorporated in their entirety herein by reference in respect to the prior art teachings they contain.

Generally, with the exception of U.S. Pat. Nos. 5,572,261, 5,530,483 and 5,751,368, the above patents describe operations without any inspection or response to the video signal images. Consequently the applicability of the descriptions of the patents is limited to particular systems where various video timing information, etc. is utilized. Patents 5,530,483 and 5,751,368 deal with measuring video delays and identifying video signal by inspection of the images carried in the video signal, but do not make any comparison or other inspection of video and audio signals. Patent 5,572,261 teaches the use of actual mouth images in the video signal and sounds in the associated audio signal to measure the relative synchronization. U.S. Pat. No. 5,572,261 describes a mode of operation of detecting the occurrence of mouth sounds in both the lips and audio. For example, when the lips take on a position used to make a sound like an E and an E is present in the audio, the time relation between the occurrence of these two events is used as a measure of the relative delay therebetween. The description in U.S. Pat. No. 5,572,261 describes the use of a common attribute for example such as particular sounds made by the lips, which can be detected in both audio and video signals. The detection and correlation of visual positioning of the lips corresponding to certain sounds and the audible presence of the corresponding sound is computationally intensive leading to high cost and complexity.

In a paper, J. Hershey, and J. R. Movellan ("Audio-Vision: Locating sounds via audio-visual synchrony" Advances in Neural Information Processing Systems 12, edited by S. A. Solla, T. K. Leen, K-R Muller. MIT Press, Cambridge, Mass. (MIT Press, Cambridge, Mass., (c) 2000)) it was recognized that sounds could be used to identify corresponding individual pixels in the video image The correlation between the audio signal and individual ones of the pixels in the image were used to create movies that show the regions of the video that have high correlation with the audio and from the correlation data they estimate the centroid of image activity and use this to find the talking face. Hershey et al. described the ability to identify which of two speakers in a television image was speaking by correlating the sound and different parts of the face to detect synchronization. Hershey et al. noted, in particular, that "[i]t is interesting that the synchrony is shared by some parts, such as the eyes, that do not directly contribute to the sound, but contribute to the communication nonetheless." There was no suggestion by Hershey and Movellan that their algorithms could measure synchronization or perform any of the other features of the present invention.

In another paper, M. Slaney and M. Covell ("FaceSync: A linear operator for measuring synchronization of video facial images and audio tracks" available at www.slaney.org). described that Eigen Points could be used to identify lips of a speaker, whereas an algorithm by Yehia, Ruben, Batikiotis- Bateson could be used to operate on a corresponding audio signal to provide positions of the fiduciary points on the face The similar lip fiduciary points from the image and fiduciary points from the Yehia algorithm were then used for a comparison to determine lip sync. Slaney and Covell went on to describe optimizing this comparison in "an optimal linear detector, equivalent to a Wiener filter, which combines the information from all the pixels to measure audio-video synchronization." Of particular note, "information from all of the pixels was used" in the FaceSync algorithm, thus decreasing the efficiency by taking information from clearly unrelated pixels. Further, the algorithm required the use of training to specific known face images, and was further described as "dependent on both training and testing data sizes." Additionally, while Slaney and Covell provided mathematical explanation of their algorithm, they did not reveal any practical manner to implement or operate the algorithm to accomplish the lip sync measurement. Importantly the Slaney and Covell approach relied on fiduciary points on the face, such as corners of the mouth and points on the lips.

SUMMARY OF INVENTION

The shortcoming of the prior art are eliminated by the method, system, and program product described herein. It will be recognized by the person of ordinary skill that the teachings herein apply to the construction of apparatus to maintain and/or restore proper image and associated information timing, the performance of steps of a method to maintain and/or restore proper image and associated information timing as well as the manufacture and distribution of programming having proper synchronization of image and associated information timing. The present invention provides for directly comparing images conveyed in the video portion of a signal to characteristics in an associated signal, such as an audio signal. Thus, contrary to the disclosure in the '261 patent, it is unnecessary to look for or utilize a common spoken attribute (such as speech syllables) within audio and video portions of the program, although such use is not mutually exclusive. Also, unlike many other types of lip sync correction devices and methods, nothing is added to the video or the associated signal for which the relative timing is being determined. The absence of any manipulation of the video or associated signal is important as it has been discovered that the addition of extra signals or information to video and/or associated signals causes compression encoders and decoders to change their delays to accommodate compression of the extra added information. In many applications the impact on the system, i.e. changing of delay, is highly undesirable in that it is desired to measure the system without such additional interference. In the description and claims herein, unless otherwise noted or readily apparent from the context, reference to video, audio and/or associated signal(s) is intended to refer to the actual program signal without the addition of extra timing signals or information for the purpose of use by the present invention. In other words, the video, audio and/or associated signal(s) are accepted from whatever source or medium they are conveyed by and utilized without alteration for the purpose of this invention. The preferred embodiment of the present invention shows a method and apparatus whereby audio and video portions of a television or other program may be directly inspected to obtain a measure of their synchrony.

The method, system, and program product described herein in preferred form provide for determining the relative timing of a video signal conveying a plurality of images and an associated signal, as an audio signal. This is accomplished by receiving the video signal, and identifying video mutual events (as described below) in images of the video signal. The associated signal, for example, an audio signal is received and mutual events (as described below) are identified in the associated signal, typically an audio signal. The video mutual events and the mutual events in the associated signal are compared to determine the relative timing between the video signal and the associated signal.

A plurality of video signals may be compared to an associated signal, or a plurality of associated signals may be compared to a video signal, or pluralities of both may be compared, depending on the particular implementation of the invention. The comparison may be utilized in the above mentioned tasks, for example to determine the delay between video and associated signal, to determine if the video is related to one or more particular associated signals or to determine if an associated signal is related to one or more video signals.

These comparisons and resulting determinations may be utilized as a measure of information which is useful about the signals being compared, and/or may be used to facilitate further operations for example such as the selection of an associated or video signal, or the adjustment of timing of a video or associated signal to facilitate timing correction or preservation. Of particular note is the preferred embodiment of the invention, which is described by way of example, wherein the images carried by a video signal are directly compared to a corresponding signal to determine the relative delay therebetween. The relative delay may then be used to correct or maintain proper timing of the signals. Note that the inventor uses the words "determine the relative delay" to mean merely to indicate whether or not the relative delay is proper (within tolerances which will be known to the person of ordinary skill in the art with respect to the particular embodiment and use of the invention), and not to mean measure or provide a measure. While the measurement or providing a measure will be taught, when one or the other is the intended meaning appropriate wording other than or in conjunction with determine will be used.

Unlike the description of U.S. Pat. No. 5,572,261, no mouth, mouth sounds or similar occurrences are needed in the audio or video. While such occurrences may be incidentally utilized by the present invention, the operation of the present invention is such that it is not so limited, and may very well operate with any association between the video image and the associated signal giving a statistical probability of some useful correlation. Moreover, unlike the description in U.S. Pat. No. 5,572,261, the method, system, and program described herein may operate with no lips or face present in the video and no speech present in the audio. For example, with respect to video the image of a bat striking a ball and the associated audible crack of the bat is one type of occurrence which may be utilized by the invention.

There are often statistical relationships between sounds and images which may be utilized by the present invention to obtain a measure or indication of the relative synchronization therebetween. The association of a change of brightness of points in the video image and the change of sound level in the audio or the change of the volume of data in a data signal are other associations which the invention may make use of. For example the changes of brightness in the video indicating the swing of the bat, or the instant change of direction of the ball when hit will both have a statistical relationship with the change of sound level in the audio. As another example an image of a race car driving around a race track will have a statistical relationship to the noise it creates. One statistical relationship is that the engine noise experiences Doppler shifts as the race car first approaches and then races away from the camera. Assuming the microphone is located near the camera, the instant of no Doppler shift will correspond to the instant when the image of the race car is the largest, since it will be closest to the camera (or alternatively when the image is the smallest when the car is furthest from the camera). Many other types of video changes will have a statistical relationship with the sound when the video images convey movement which movement creates or alters sound.

As used herein the term "Muev" is the contraction of MUtual EVent to mean an event occurring in an image, signal or data which is unique enough that it may be accompanied by another Muev in an associated signal. Accordingly, an image Muev may have a probability of matching a Muev in an associated signal. For example in respect to the bat hitting the ball example above, the crack of the bat in the audio signal is a Muev, the swing of the bat is a Muev and the change of direction of the ball is also a Muev. Clearly the audio Muev and two video Muevs each have a probability of matching the other in time. The detection of the video Muev may be accomplished by looking for motion, and in particular quick motion in one or a few limited area of the image while the rest of the image is static, i.e. the pitcher throwing the ball and the batter swinging at the ball. In the audio, the crack of the bat may be detected by looking for short, percussive sounds, which are isolated in time from other short percussive sounds. One of ordinary skill in the art will recognize from these teachings that other Muevs may be identified in associated signals and utilized for the present invention. Most importantly, it is not necessary to know before hand just what sound or just what image is important, as the utilization of changes of brightness, direction, and other characteristics of the image, and changes in sound levels, energy, spectral content and other characteristics of the sound may be utilized as Muevs, with the Muevs then being analyzed to look for statistical relationships which indicate the relative presence and/or timing thereof.

BRIEF DESCRIPTION OF DRAWINGS

FIG. 7 is a portion of the flow chart for an initial step for correcting head tilt.

FIG. 8 is a portion of the flow chart for tilting the face to vertical and isolating the lips.

FIG. 9 is a portion of the flow chart for isolating pixels of the upper lip.

FIG. 10 is a portion of the flow chart for isolating the upper lip.

FIG. 11 is a portion of the flow chart for continuing isolation of the upper lip.

FIG. 12 is a portion of the flow chart for continuing the process of FIGS. 11 and 12.

FIG. 13 is a portion of the flow chart for characterizing the upper limit determined in accordance with the process shown in FIGS. 9 through 12.

FIG. 14 is a portion of the flow chart for continuing the process of FIGS. 9 through 13 and matching the upper lip to a lower lip.

FIG. 15 is a portion of the flow chart for characterizing the lower lip.

FIG. 16 is a portion of the flow chart for characterizing both lips.

FIG. 17 is a portion of the flow chart for characterizing a sequence of lip movements to characterize video mutual events.

FIG. 18 is a portion of the flow chart for further characterizing the sequence of lip movements.

FIG. 19 is a portion of the flow chart for going to the next frame.

DETAILED DESCRIPTION

The preferred embodiment of the invention has an image input, an image mutual event identifier which provides image Muevs, and an associated information input, an associated information mutual event identifier which provides associated information Muevs. The image Muevs and associated information Muevs are suitably coupled to a comparison operation which compares the two types of Muevs to determine their relative timing. While referred to as a comparison, the person of ordinary skill in the art will understand that this function may take on a range of simple to complex analyses of the Muevs in many applications of the invention, as will be known from the teachings herein. Correlations and convolutions are especially useful as comparisons as are other statistical operations, as is well known in the field of statistical analysis of data sets (or streams). In particular embodiments of the invention, Muevs may be labeled in regard to the method of conveying images or associated information, or may be labeled in regard to the nature of the images or associated information. For example video Muev, brightness Muev, red Muev, chroma Muev and luma Muev are some types of image Muevs and audio Muev, data Muev, weight Muev, speed Muev and temperature Muev are some types of associated Muevs which may be commonly utilized.

Figure 1:
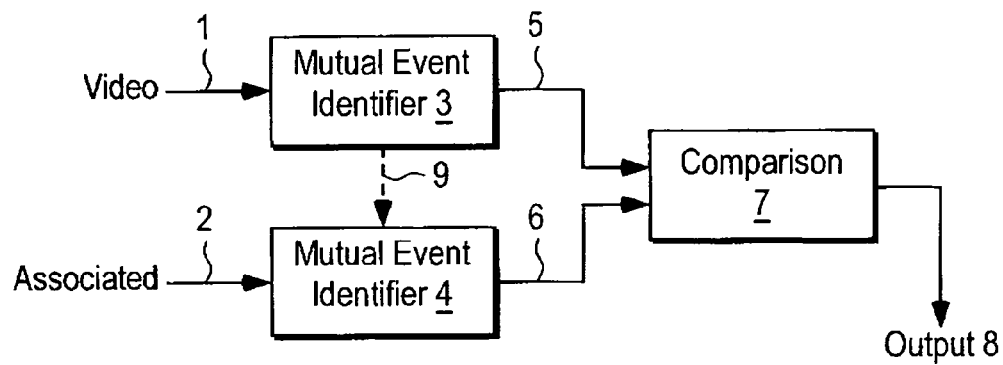
FIG. 1 shows a diagram of the present invention with images conveyed by a video signal and associated information conveyed by an associated signal and a synchronization output.

FIG. 1 shows the preferred embodiment of the invention wherein video conveys the images and an associated signal conveying the associated information. FIG. 1 has video input 1, mutual event identifier 3 with Muev output 5, associated signal input 2, mutual event identifier 4 with Muev output 6, comparison 7 with output 8.

In operation video signal 1 is coupled to an image Muev identifier 3 which operates to compare a plurality of image frames of video to identify the movement (if present) of elements within the image conveyed by the video signal. The computation of motion vectors, commonly utilized with video compression such as in MPEG compression, is useful for this function. It is useful to discard motion vectors which indicate only small amounts of motion and use only motion vectors indicating significant motion in the order of 5% of the picture height or more. When such movement is detected, it is inspected in relation to the rest of the video signal movement to determine if it is an event that is likely to have a corresponding Muev in the associated signal. In this instance, such events are small regions of elements that moved while the surrounding elements remained relatively static.

A Muev output is generated at 5 indicating the presence of the Muev(s) within the video field or frame(s), in this example where there is movement that is likely to have a corresponding Muev in the associated signal. In the preferred form it is desired that a binary number be output for each frame with the number indicating the number of Muevs, i.e. small region elements which moved in that frame relative to the previous frame, while the remaining portion of the frame remained relatively static.

It may be noted that while video is indicated as the preferred method of conveying images to the image Muev identifier 3, other types of image conveyances such as files, clips, data, etc. may be utilized as the operation of the present invention is not restricted to the particular manner in which the images are conveyed. Other types of image Muevs may be utilized as well in order to optimize the invention for particular video signals or particular types of expected images conveyed by the video signal. For example the use of brightness changes within particular regions, changes in the video signal envelope, changes in the frequency or energy content of the video signal carrying the images and other changes in properties of the video signal may be utilized as well, either alone or in combination, to generate Muevs.

The associated signal 2 is coupled to a mutual event identifier 4 which is configured to identify the occurrence of associated signal Muevs within the associated signal. When Muevs are identified as occurring in the associated signal a Muev output is provided at 6. The Muev output is preferred to be a binary number indicating the number of Muevs which have occurred within a contiguous segment of the associates signal 2, and in particular within a segment corresponding in length to the field or frame period of the video signal 1 which is utilized for outputting the movement signal number 5. This time period may be coupled from movement identifier 3 to Muev identifier 4 via suitable coupling 9 as will be known to persons of ordinary skill in the art from the description herein. Alternatively, video 1 may be coupled directly to Muev identifier 4 for this and other purposes as will be known from these present teachings.

It may be noted that while a signal is indicated as the preferred method of conveying the associated information to the associated information Muev identifier 4, other types of associated information conveyances such as files, clips, data, etc. may be utilized as the operation of the present invention is not restricted to the particular manner in which the associated information is conveyed. In the preferred embodiment of FIG. 1 the associated information is also known as the associated signal, owing to the preferred use of a signal for conveyance. Similarly, the associated information Muevs are also known as associated signal Muevs. The detection of Muevs in the associated signal will depend in large part on the nature of the associated signal. For example data which is provided by or in response to a device which is likely present in the image such as data coming from the customer input to a teller machine would be a good Muev. Audio characteristics that are likely correlated with motion are good Muevs as discussed below. As other examples, the use of changes within particular regions of the associated signal, changes in the signal envelope, changes in the information, frequency or energy content of the signal and other changes in properties of the signal may be utilized as well, either alone or in combination, to generate Muevs. More details of identification of Muevs in particular signal types will be provided below in respect to the detailed embodiments of the invention.

Consequently, at every image, conveyed as a video field or frame period, a Muev output is presented at 5 and a Muev output is presented at 6. The image Muev output, also known in this preferred embodiment as a video Muev owing to the use of video as the method of conveying images, and the associated signal Muev output are suitable coupled to comparison 7 which operates to determine the best match, on a sliding time scale, of the two outputs. In the preferred embodiment the comparison is preferred to be a correlation which determines the best match between the two signals (if there is one) and the relative time therebetween.

Figure 2:
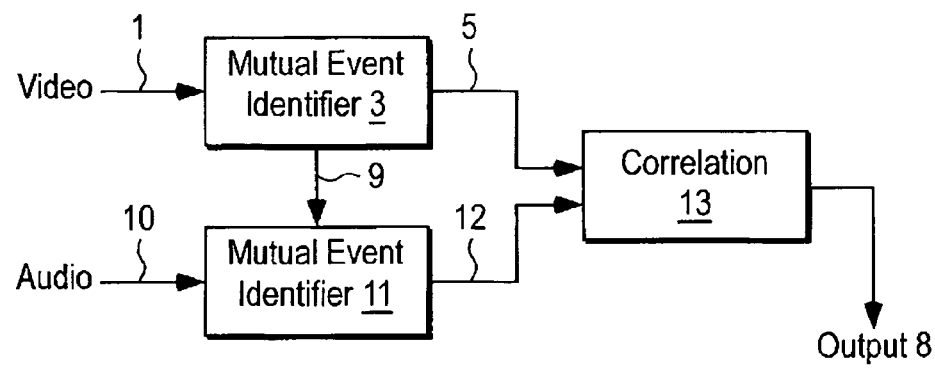
FIG. 2 shows a diagram of the present invention as used with a video signal conveying images and an audio signal conveying associated information.

FIG. 2 shown a particular embodiment of the invention as utilized with television program audio and video signals. FIG. 2 shows video input and video Muev identifier and output and video time period coupling, 1, 3, 5 and 9 respectively as in FIG. 1, and audio input 10, audio Muev identifier and output 11 and 12, and correlation 13.

Audio Muev identifier 11 is preferred to inspect the audio signal over time intervals of a sliding time window of three hundred milliseconds and determine significant changes in the audio power envelope within that window. The peaks of envelope changes (either positive or negative) of greater or lesser than 30% of the average over the same window are identified as Muevs. The number of Muevs identified within each video frame (as enabled by 9) is output at 12 as a binary number.

In operation, video Muevs from 5 and audio Muevs from 12 are present for each video frame, noting that if no Muevs occur a zero is output. The numbers of Muevs are correlated by 13 over a time period of several seconds, for example 5 seconds, to provide a measure of the synchronization between audio at 10 and video at 1. While in some applications it is simply desirable to know if audio and video are synchronized, or synchronized within defined limits, in other applications the amount and direction of synchronization error will be desired. These measurements may be had by known correlation techniques as will be apparent to one of ordinary skill in the art from the present teachings.

Figure 3:
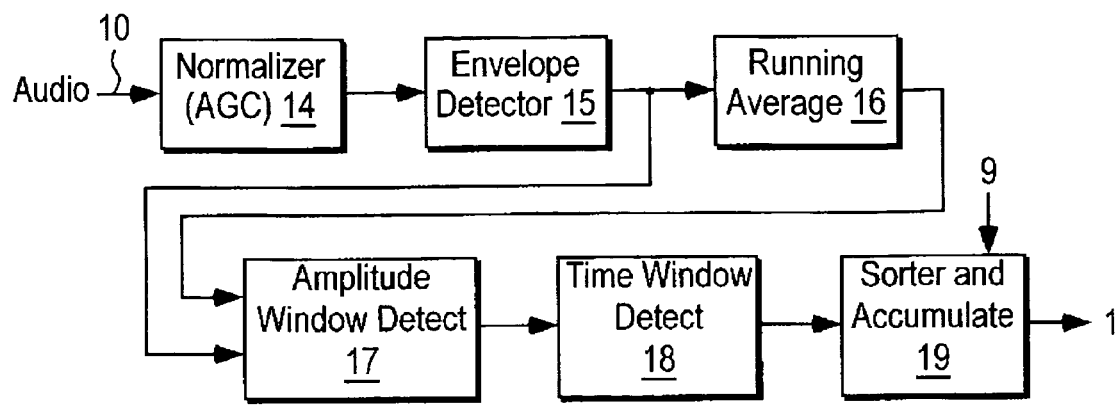
FIG. 3 shows an embodiment of 11 of FIG. 2 in further detail.

FIG. 3 shows an embodiment of the Muev identifier 11 of FIG. 2 having audio input 10, Muev output 12 and video frame time period coupling 9. Audio is coupled to normalizer 14 where its level is normalized, preferably by automatic gain control, however other types of normalization may be used. The normalized audio is coupled from 14 to an envelope detector 15 which is preferred to be an RMS power function which outputs a measure of the RMS power in the normalized audio signal to running average 16 and amplitude window detect 17. The running average block operates to average the RMS power of the normalized audio over a sliding 200 ms window, with the average corresponding to the past and future 100 ms being coupled to the amplitude window detect 17.

In the amplitude window detect the instant RMS power from 15 is compared to the running average of the RMS power from 16 to determine if the instant is 30% greater or lesser than the average. The result of 17 indicating whether the instant RMS power excursions go outside a 30% window of the average RMS power is coupled to the sort & accumulate 19 where it is determined how many of these outside excursions occur within each video frame coupled thereto via 9. The number of these out of window excursions is the audio Muev number which is output corresponding to the frame at 12. While preferred amounts of time, window sizes and operations are described in reference to FIG. 3 by way of example, one of ordinary skill in the art will recognize that any one or more of these parameters may be departed from in order to accommodate use of the invention with particular types of expected Muevs.

Figure 4:
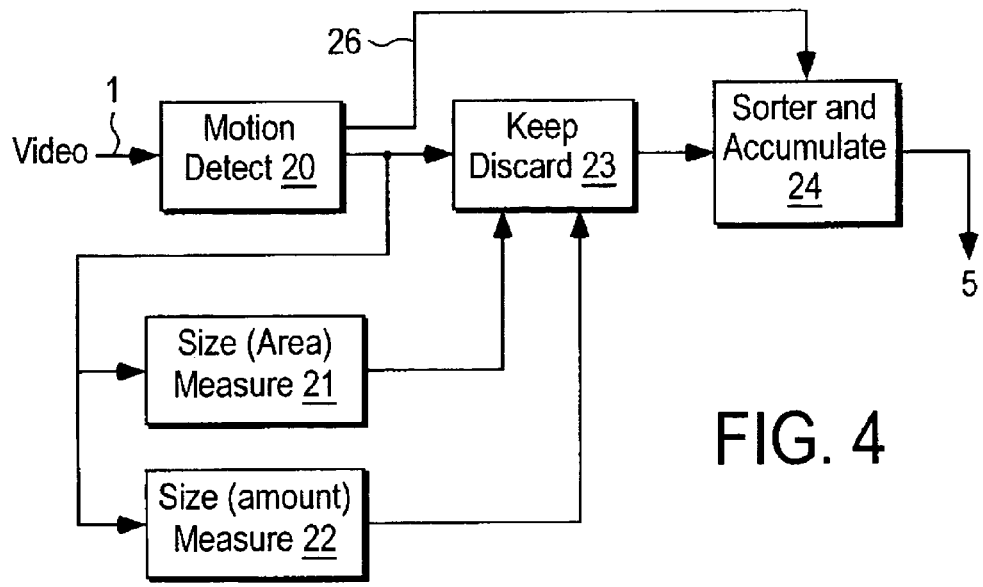
FIG. 4 shows an embodiment of 3 of FIG. 2 in further detail.

FIG. 4 shows an embodiment of image Muev identifier 3 of FIG. 2. Images conveyed by video signal 1 are coupled to a motion detector 20 which may for example be a known motion detector utilized in video compression systems and providing motion vectors 25 indicating the direction and magnitude of motion for elements in the image as related to previous and possibly upcoming images. The motion vectors are suitably coupled to keep or discard logic 23, as well as to two size measures, one for determining the size of the area to which like motion vectors pertain 21 and one for determining the amount of motion which the motion vectors indicate 22.

The measure elements 21 and 22 thus provide information to the keep or discard logic 23 to allow 23 to either keep particular motion vectors representative of wanted Muevs, or to discard unwanted motion vectors. Alternatively 23 may provide new values which are responsive to wanted motion vectors, for example indicating an area over which consistent motion is exhibited.

The information provided by 23 is suitably coupled to a sorter & accumulate element which keeps track of the number of Muevs which are present in a particular image. It is preferred that image and timing information for example image frames are suitably coupled from 20 to 24 via 26, since such timing information is utilized as part of 20. Alternatively video 1 may be coupled to 24 to facilitate providing Muevs image by image. The image Muev information is coupled from 24 to 13 via 5 as previously described.

Figure 5:
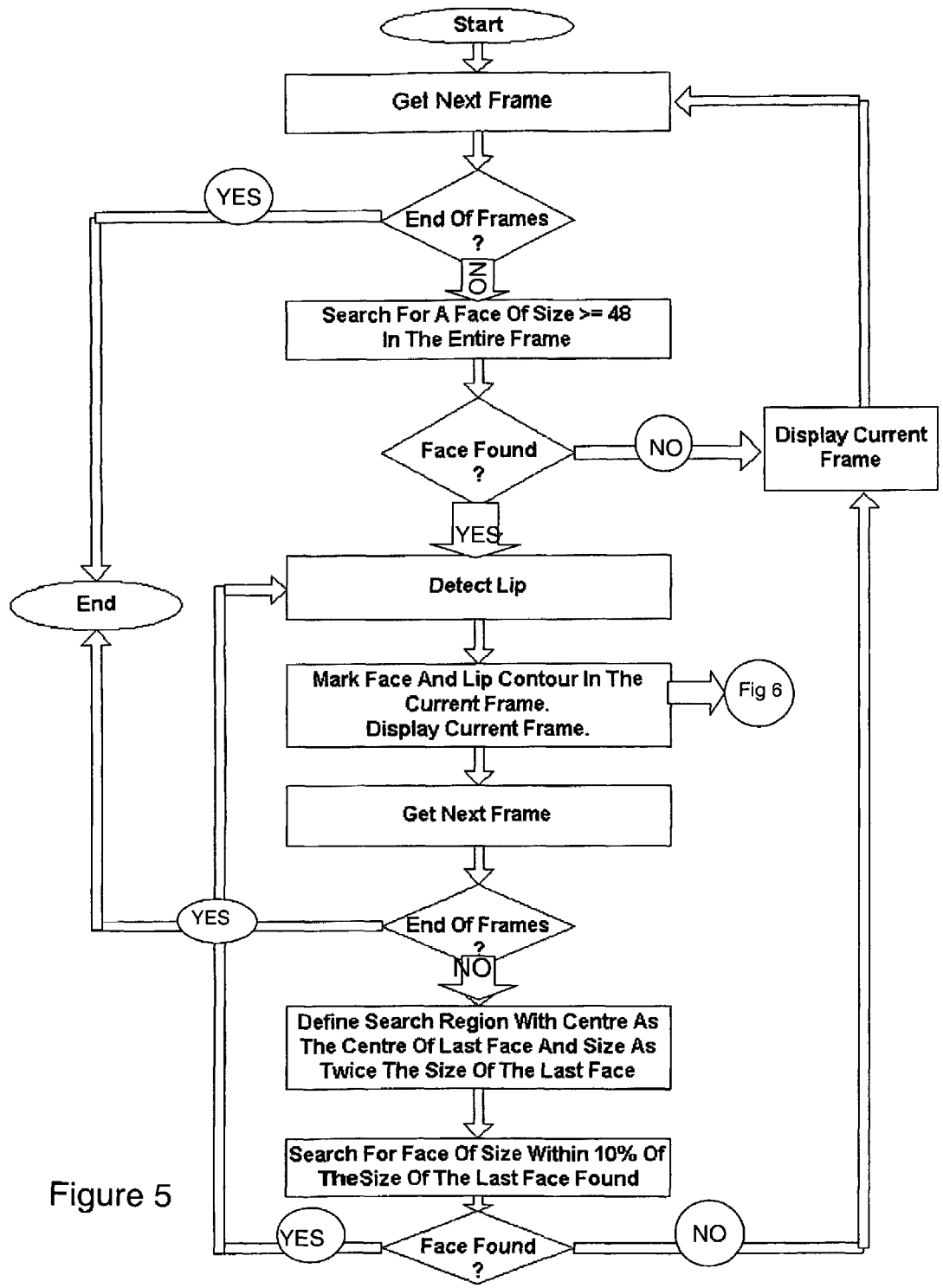
FIG. 5 illustrates a flow chart for identifying facial features, as lips, identified with speech patterns.

FIG. 5 illustrates a high level flow chart for identifying facial features, such as lips, which are used as video Muevs, and may be statistically identified with speech patterns which are used as audio Muevs. In particular, it will be noted that while lips are being located in faces, the lip forms themselves are not the Muev information which is sought, rather the location of the lips provides facial eigen points and it is the movement of the facial eigen points which is used to create video Muevs. The video Muevs are analyzed relative to audio energy peaks that are used to create audio Muevs. The process starts with getting a frame, and testing to see if it is or is not the last frame. If not, the frame is searched for a face. If a face is found, a search is conducted for the lips and the facial contours.

Figure 6:
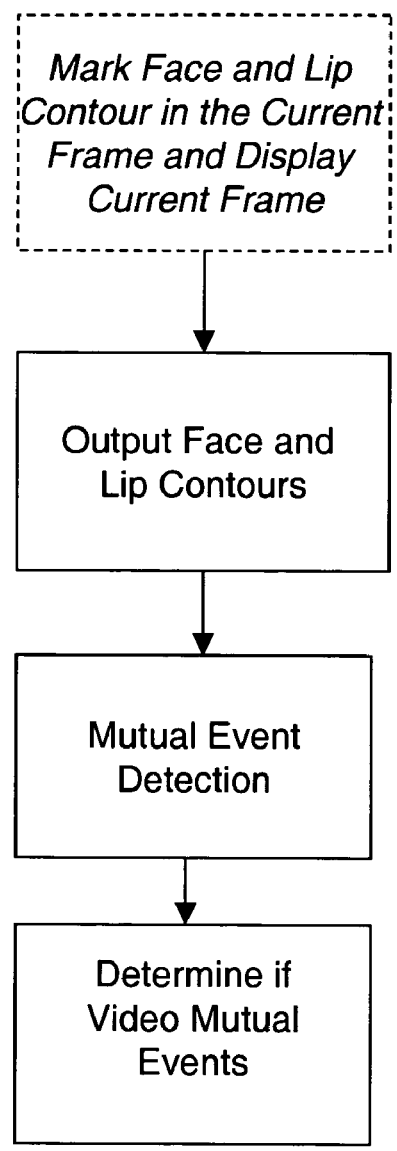
FIG. 6 illustrates a marked lip contour output.

FIG. 6 illustrates the marked face and marked lip contours being output from marking up face and lip contours in a current frame to a video mutual events box. The video mutual events box detects video mutual events by an 8 pixel by 8 pixel MPEG motion detector. This 8 pixel by 8 pixel MPEG motion detector receives 8 pixel by 8 pixel lip contours and creates motion vectors that are used to characterize the motion. Preferably the two lowest frequency motion vectors are used for motion estimation and Muev characterization. Of course, for other types of video events and video motion, higher frequencies may be used.

Figure 7:
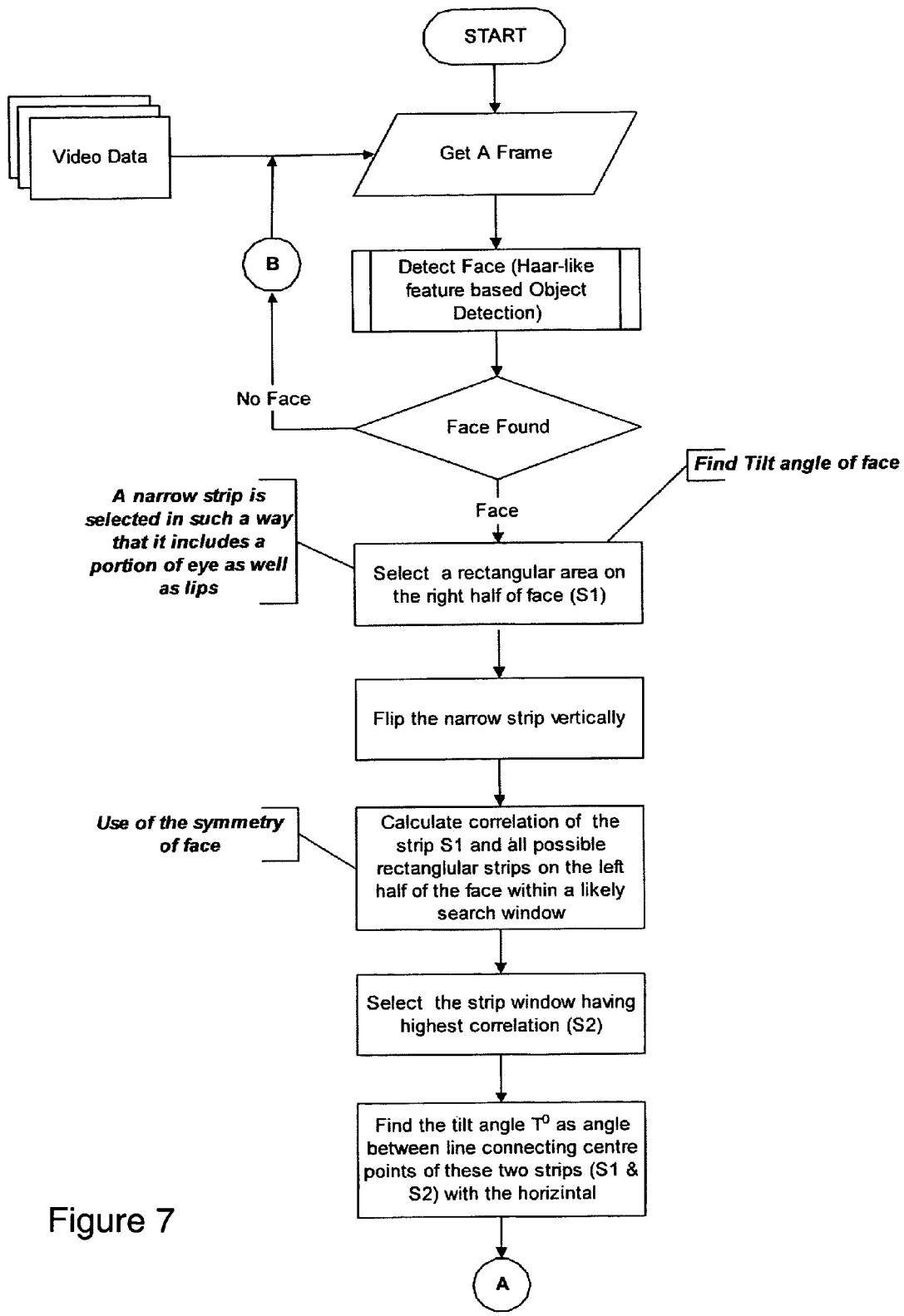
FIGS. 7 through 19 illustrate one method for isolating lip movements to obtain video mutual events associated with audio mutual events.
Figure 8:
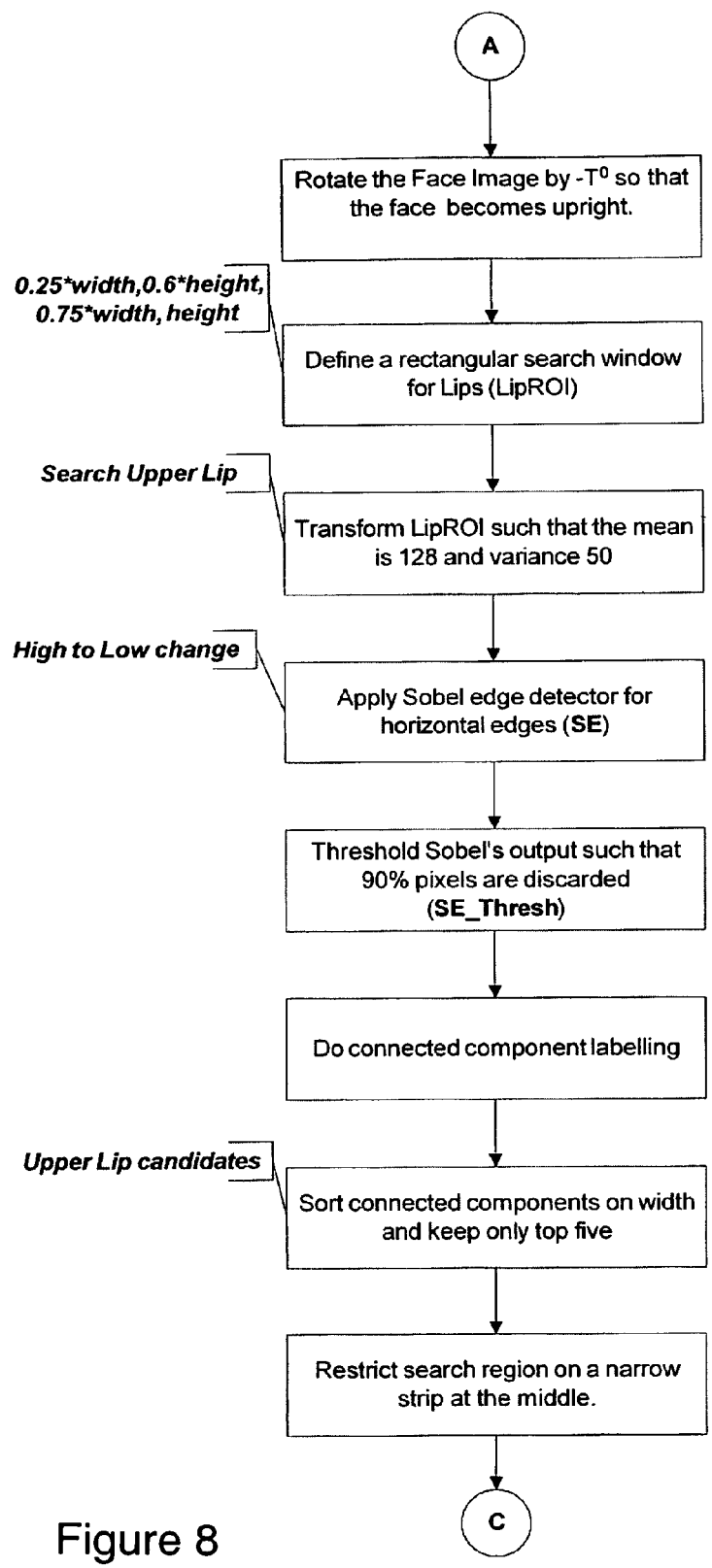

FIGS. 7 through 19 illustrate one method for isolating lip movements to obtain video mutual events associated with audio mutual events. FIG. 7 is a portion of the flow chart for an initial step for correcting head tilt. In the next stage, FIG. 8 illustrates a portion of the flow chart for tilting the face to vertical and isolating the lips.

Figure 9:
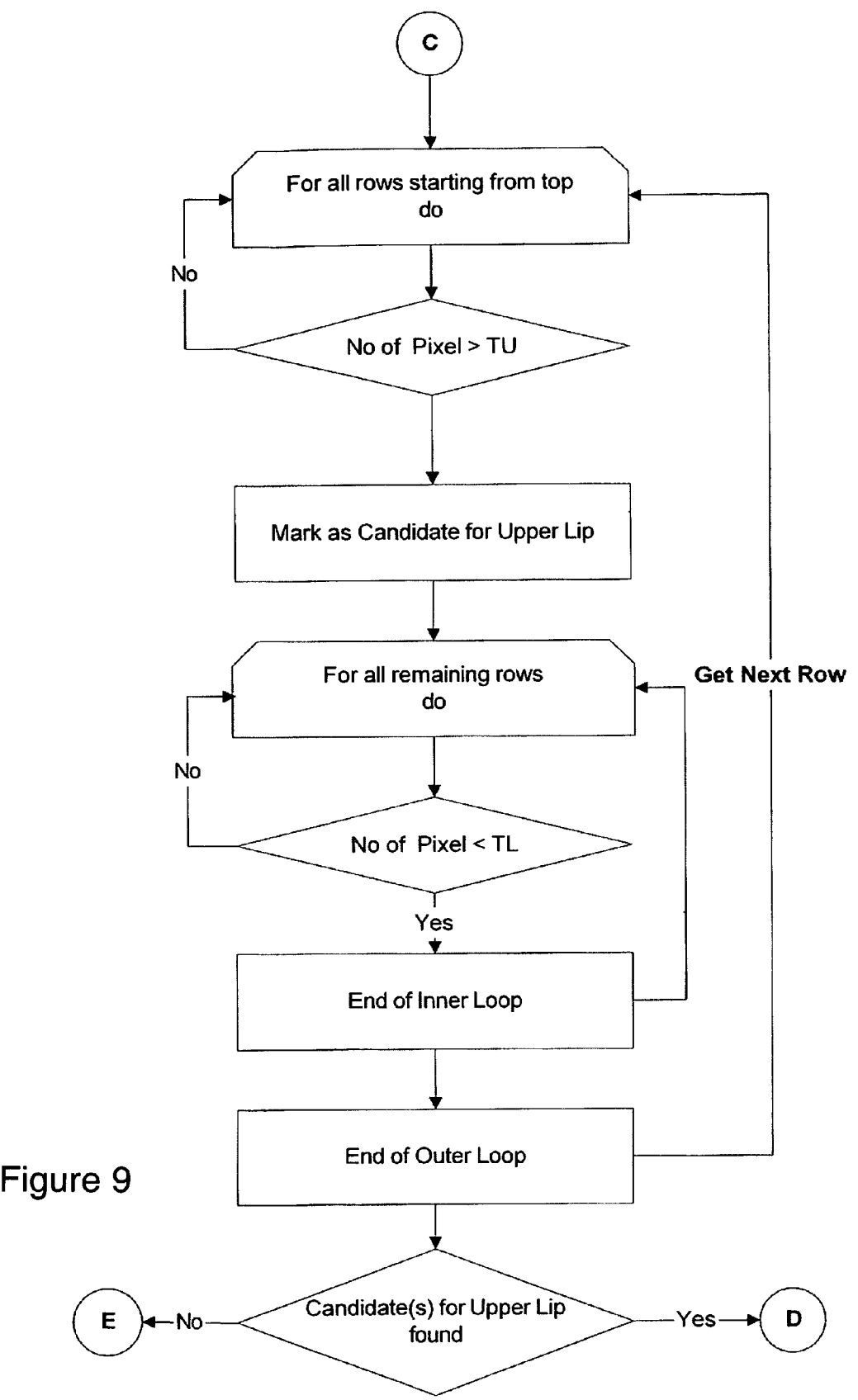
Figure 10:
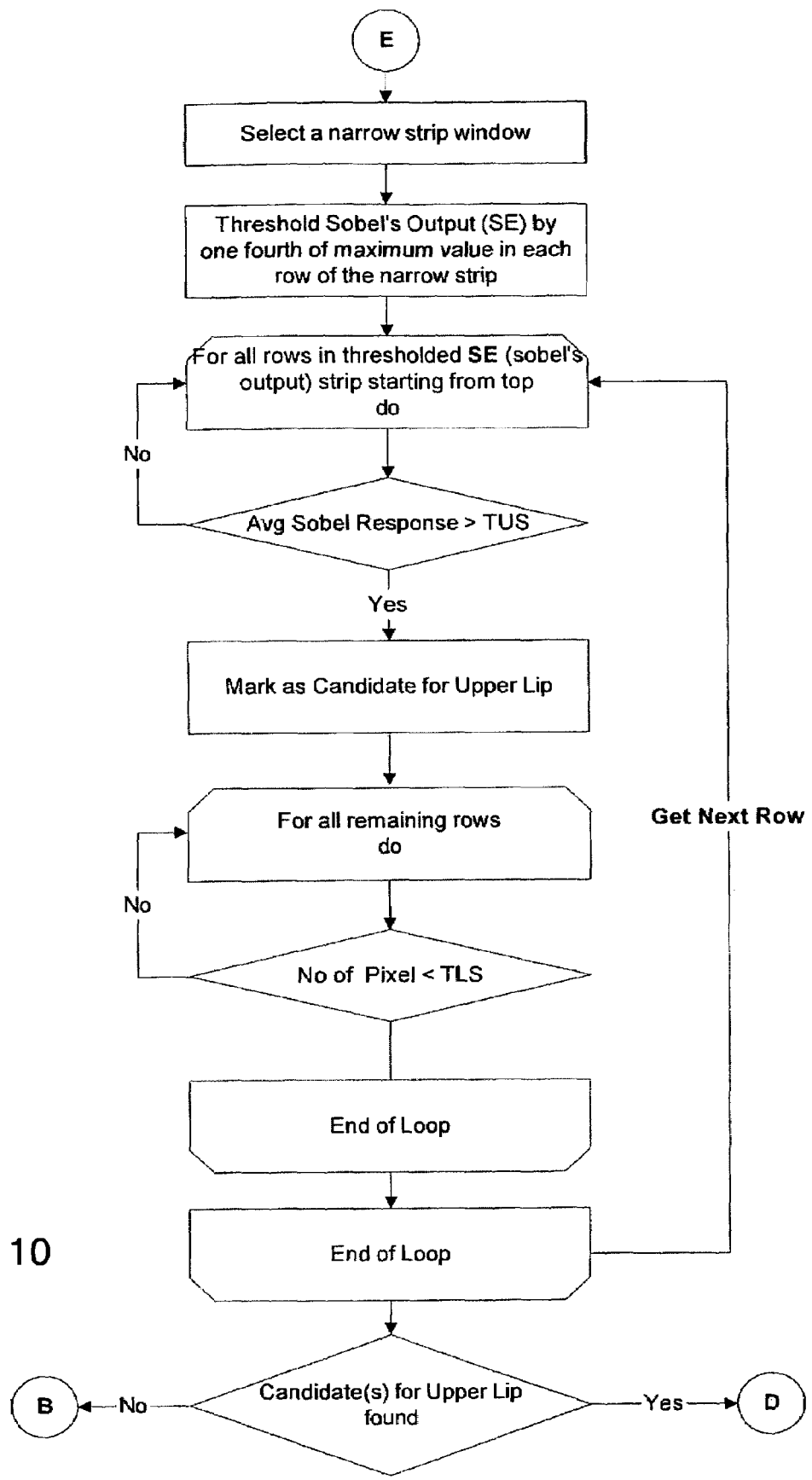
Figure 11:
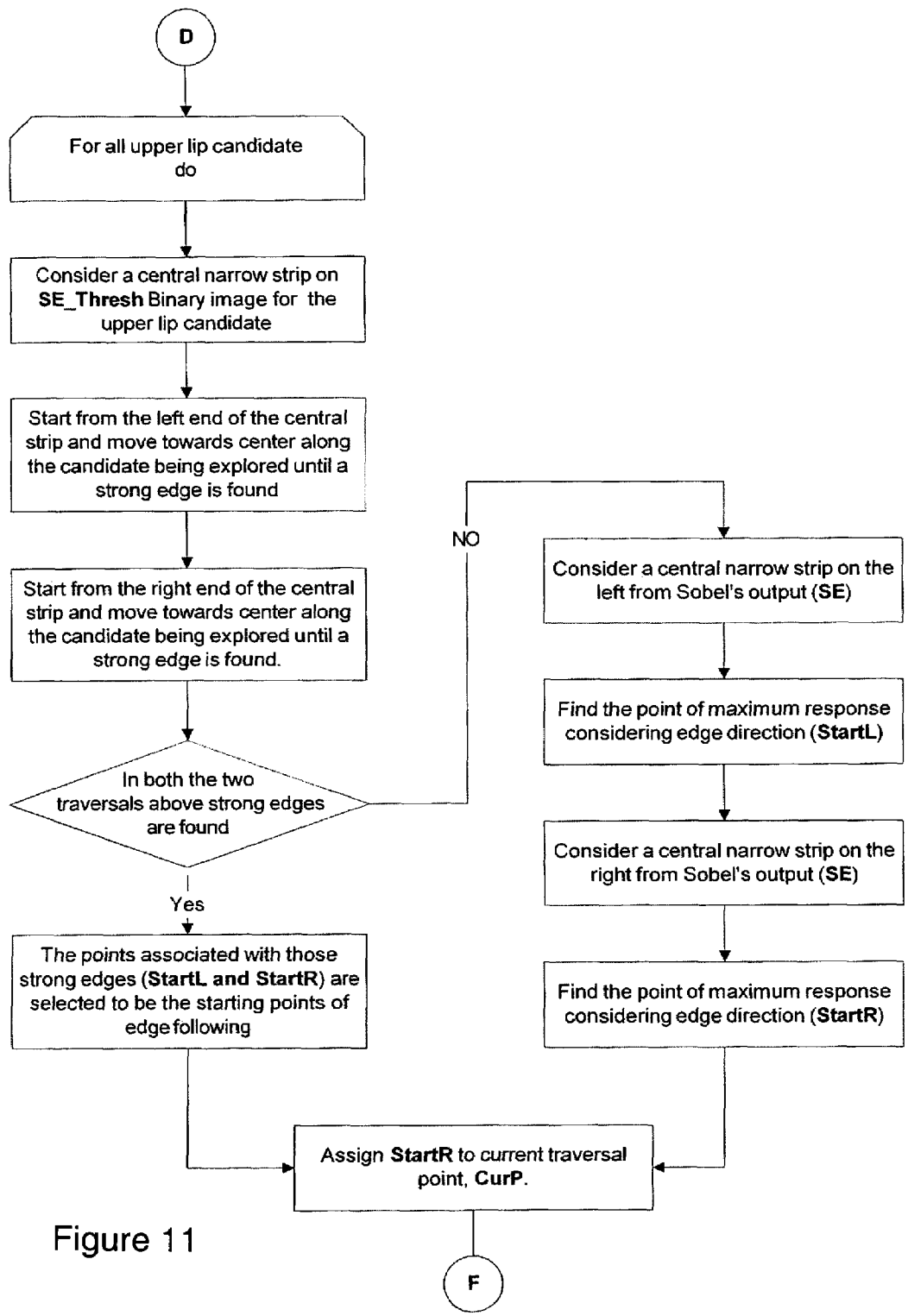
Figure 12:
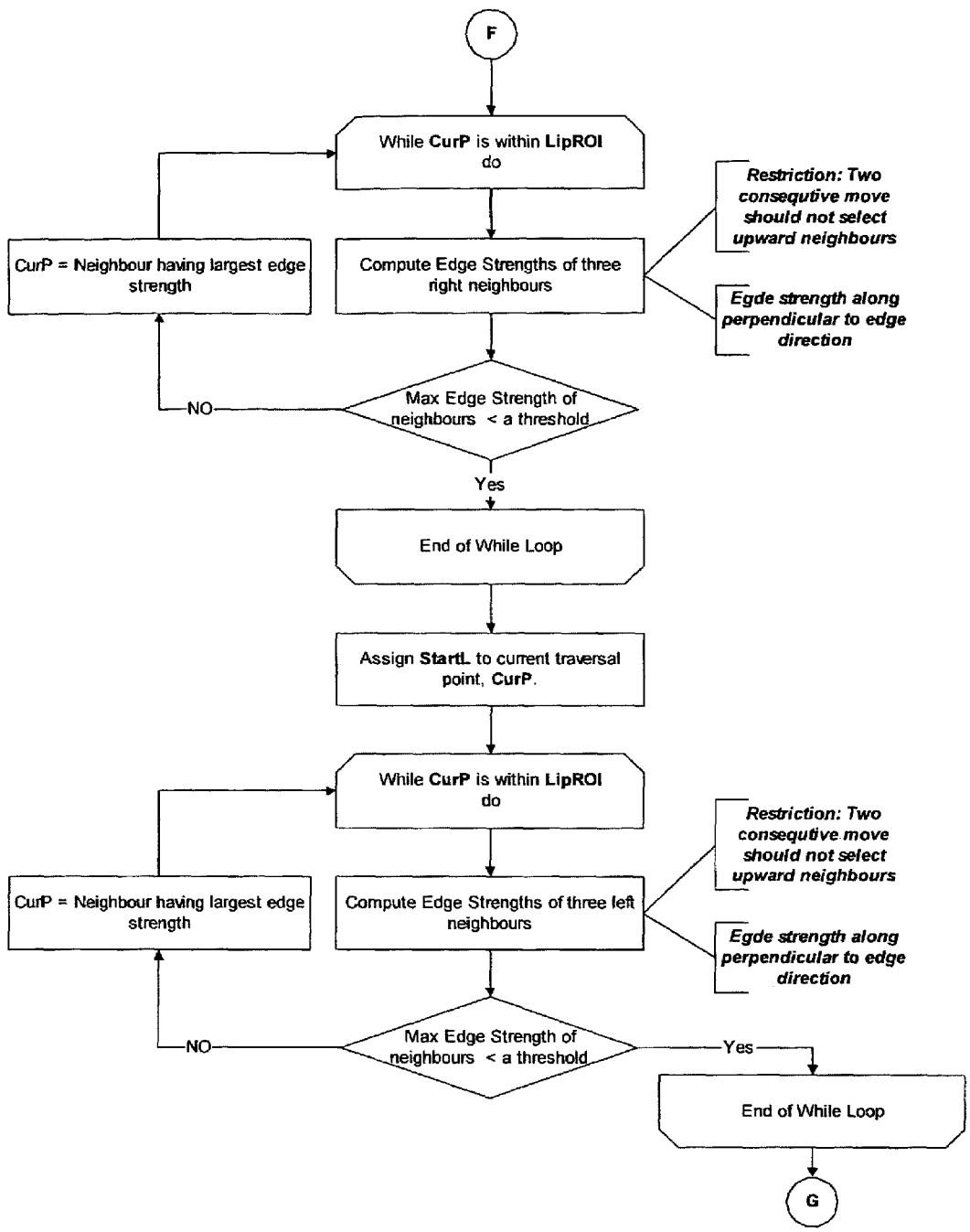

Isolating and characterizing the shape (and in a sequence of frames the movement of the lips) is a part of determining visual Muevs and correlating visual Muevs with audio Muevs. FIG. 9 is a portion of the flow chart for isolating pixels of the upper lip, while FIG. 10 is a next portion of the flow chart for isolating the upper lip. FIG. 11 is a portion of the flow chart for continuing isolation of the upper lip. FIG. 12 is a portion of the flow chart for continuing the process of FIGS. 10 and 11.

Figure 13:
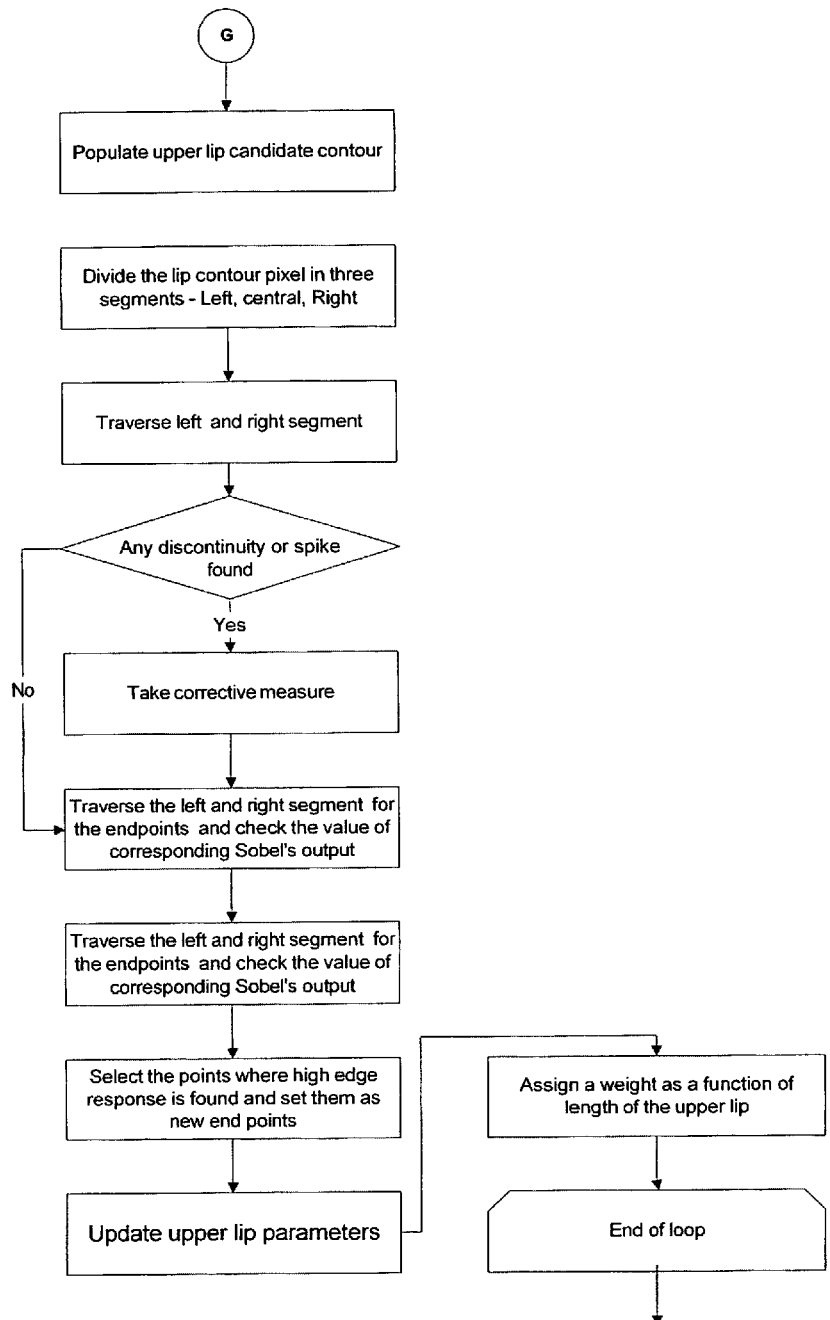
Figure 14:
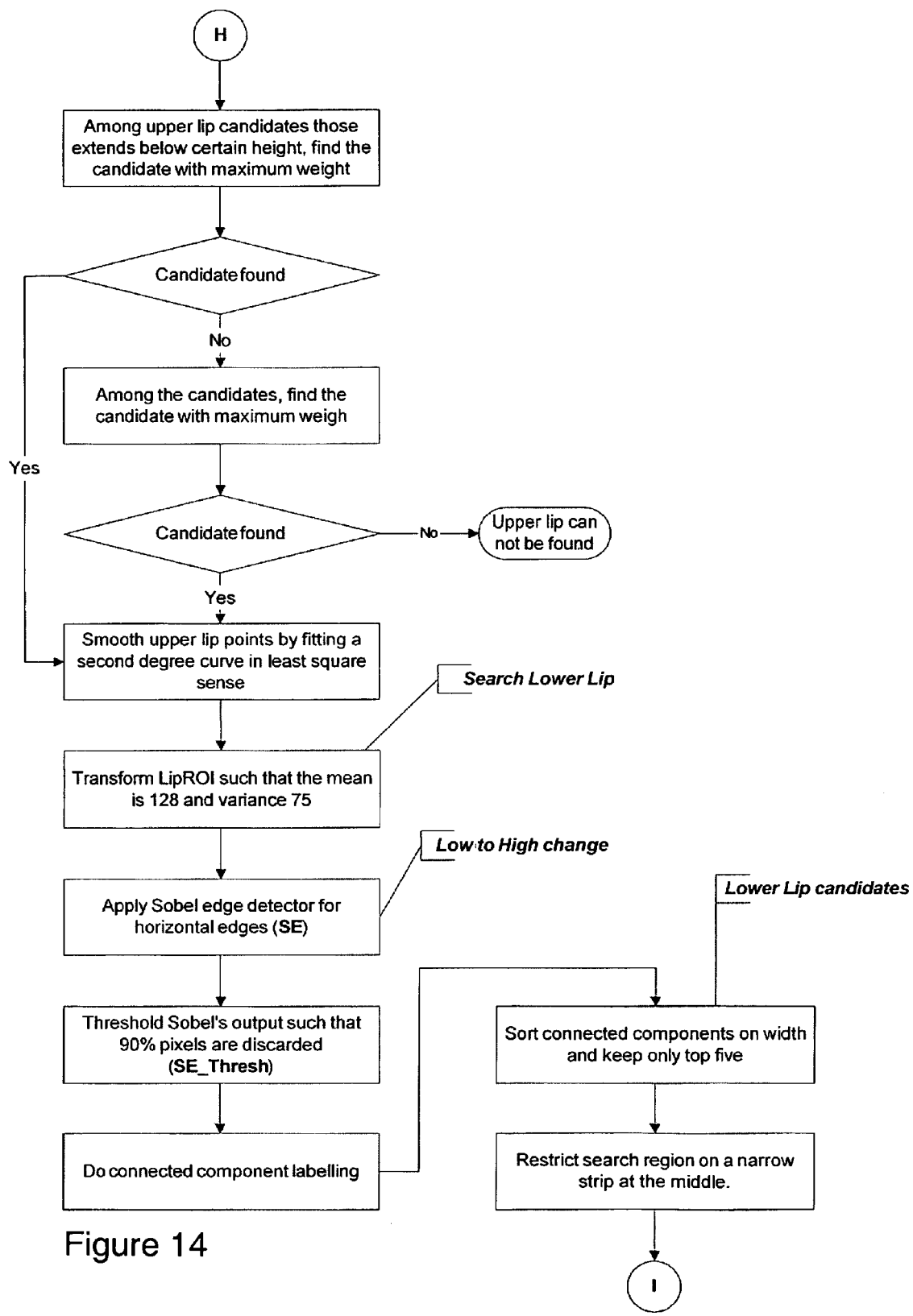

FIG. 13 is a portion of the flow chart for characterizing the upper limit determined in accordance with the process shown in FIGS. 9 through 12. FIG. 14 is a portion of the flow chart for continuing the process of FIGS. 9 through 13 and matching the upper lip to a lower lip.

Figure 15:
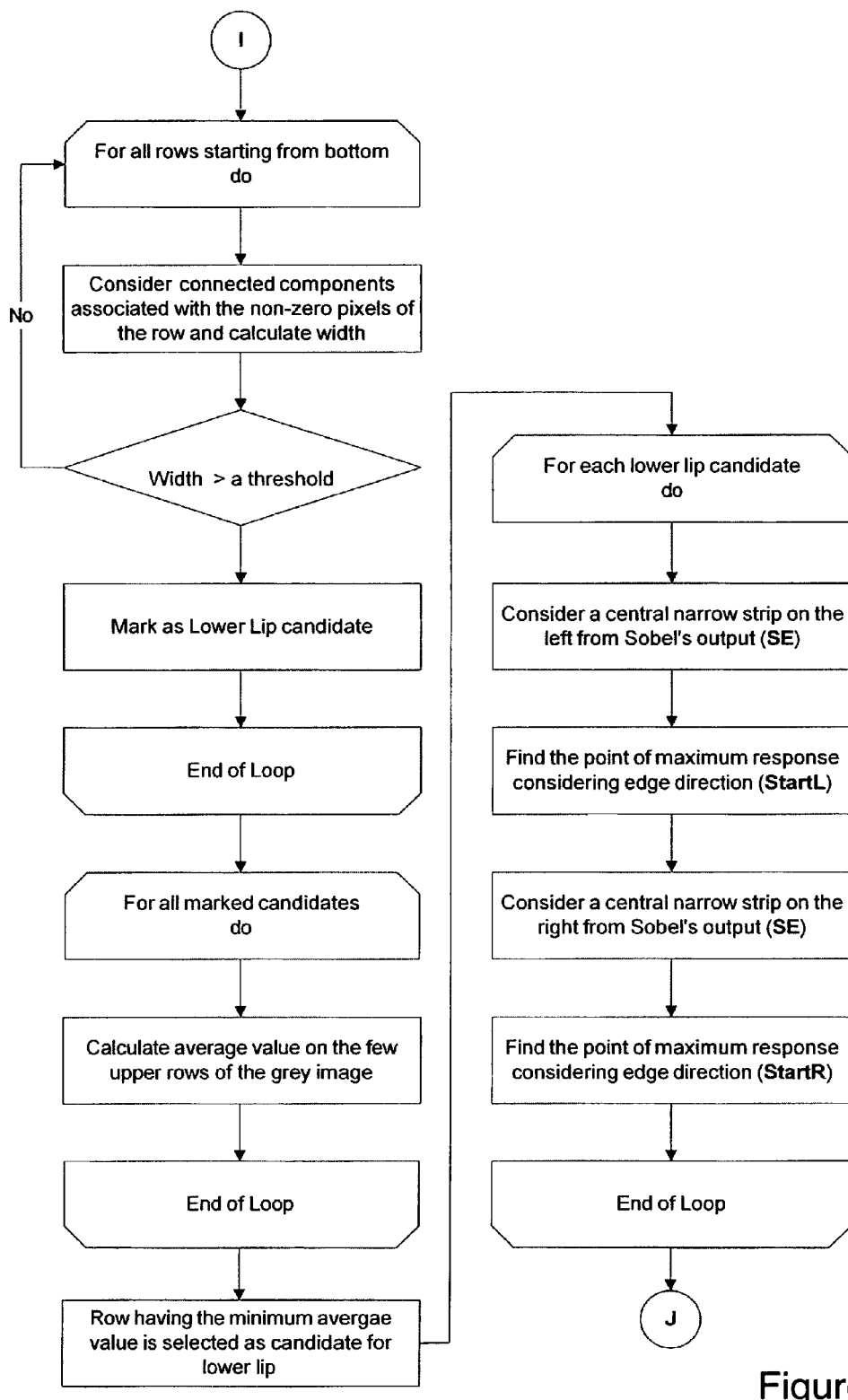
Figure 16:
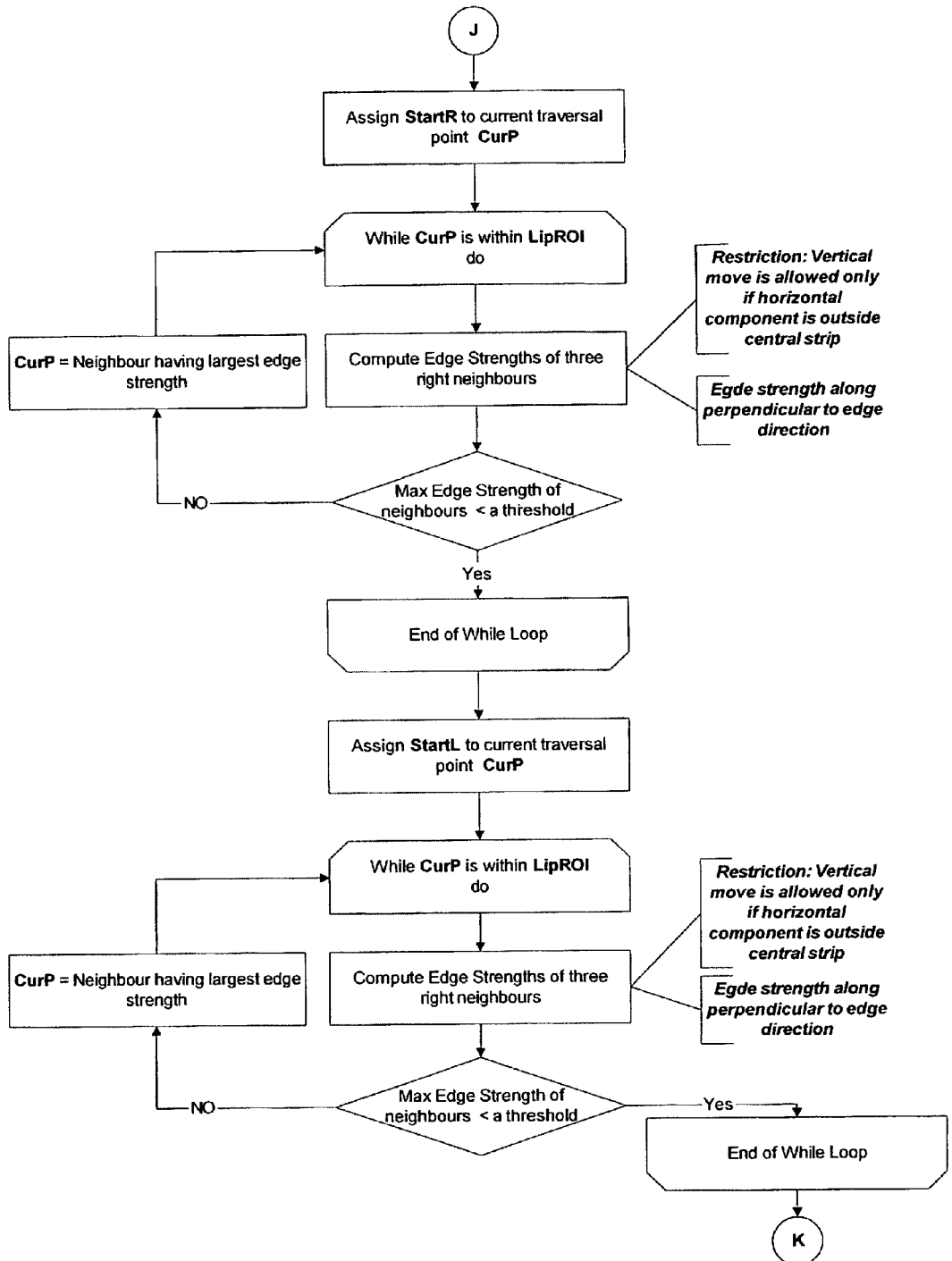

FIG. 15 is a portion of the flow chart for characterizing the lower lip. FIG. 16 is a portion of the flow chart for characterizing both lips.

Figure 17:
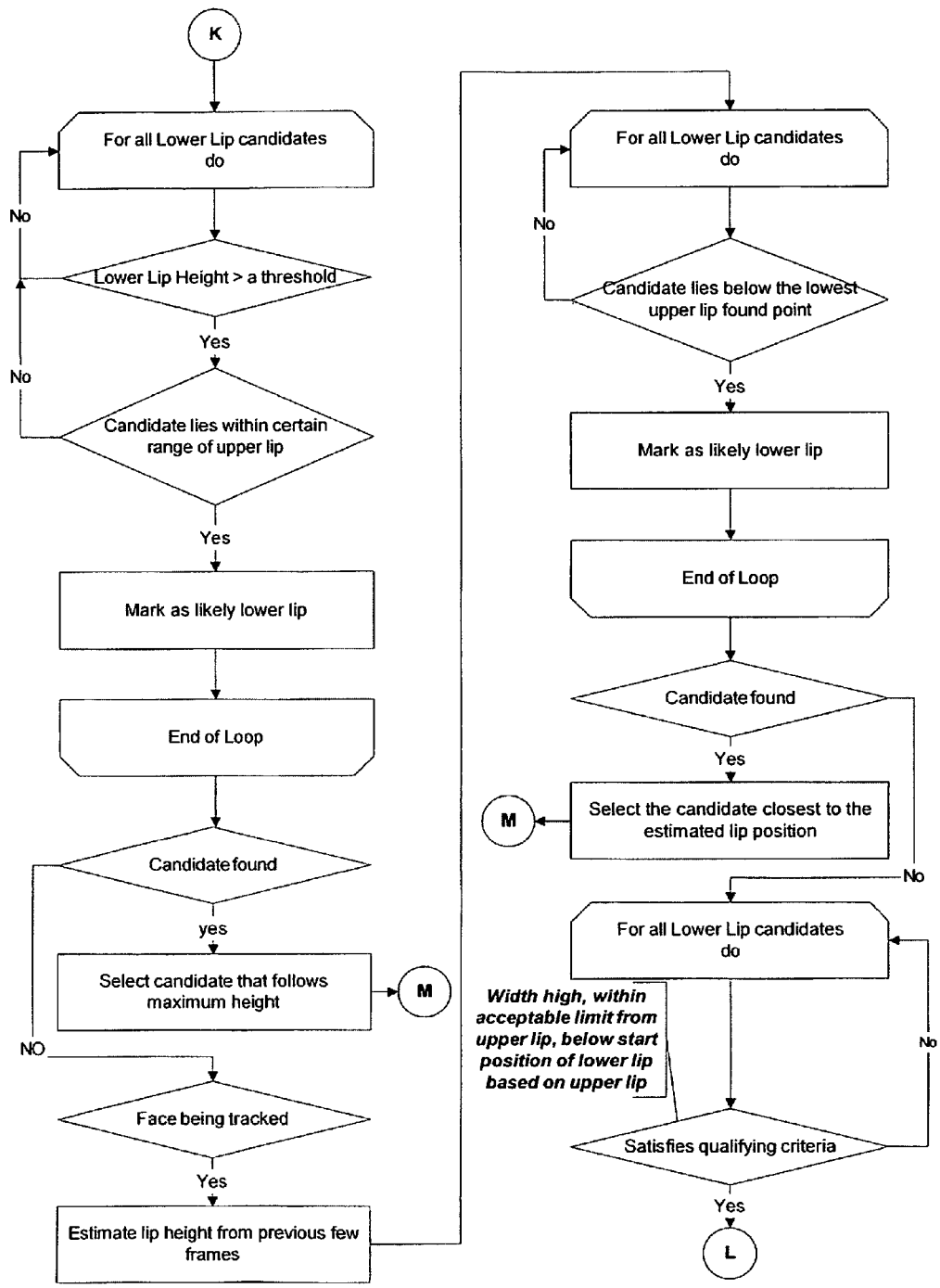
Figure 18:
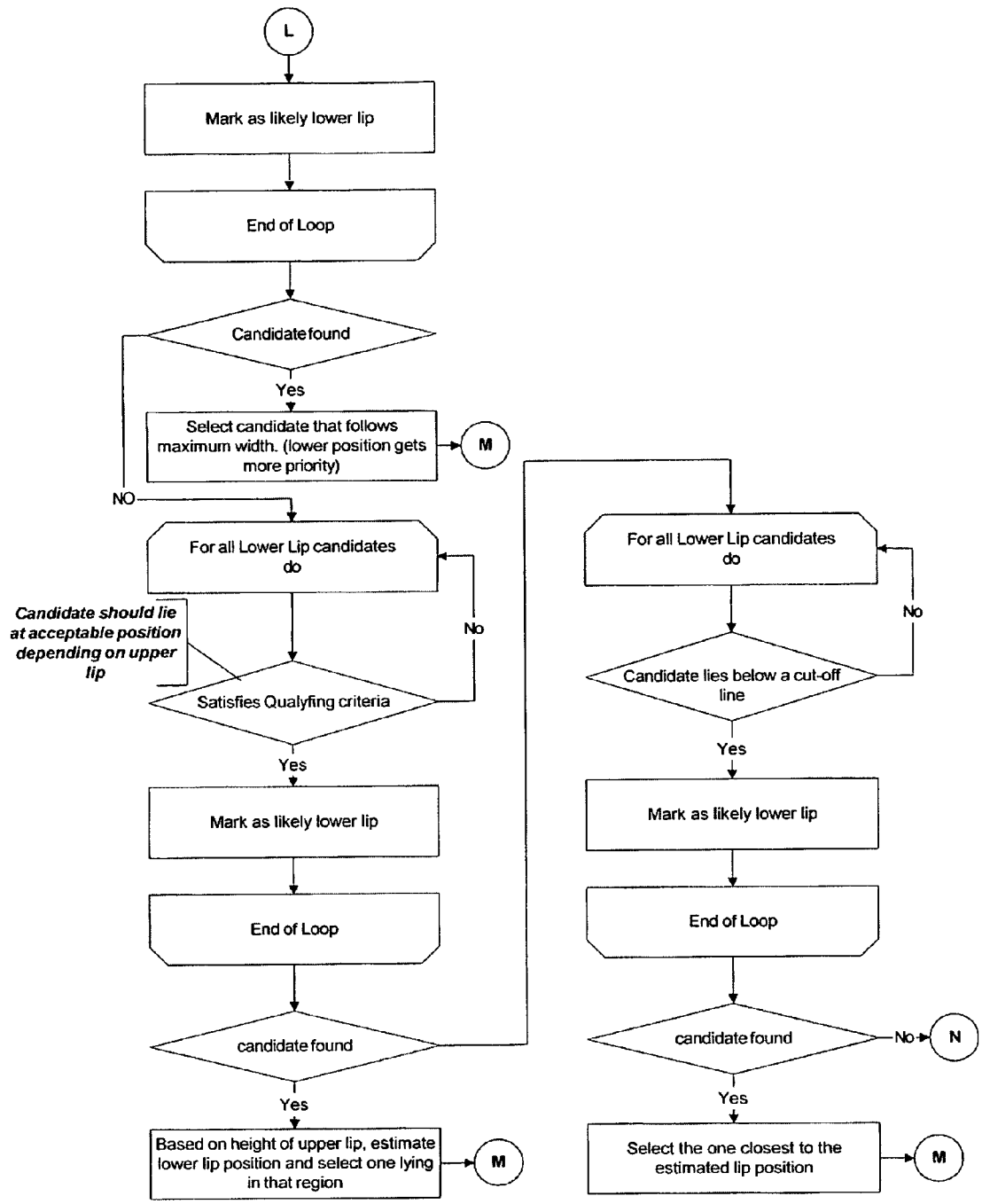

FIG. 17 is a portion of the flow chart for characterizing a sequence of lip movements to characterize video mutual events. FIG. 18 is a portion of the flow chart for further characterizing the sequence of lip movements.

Figure 19:
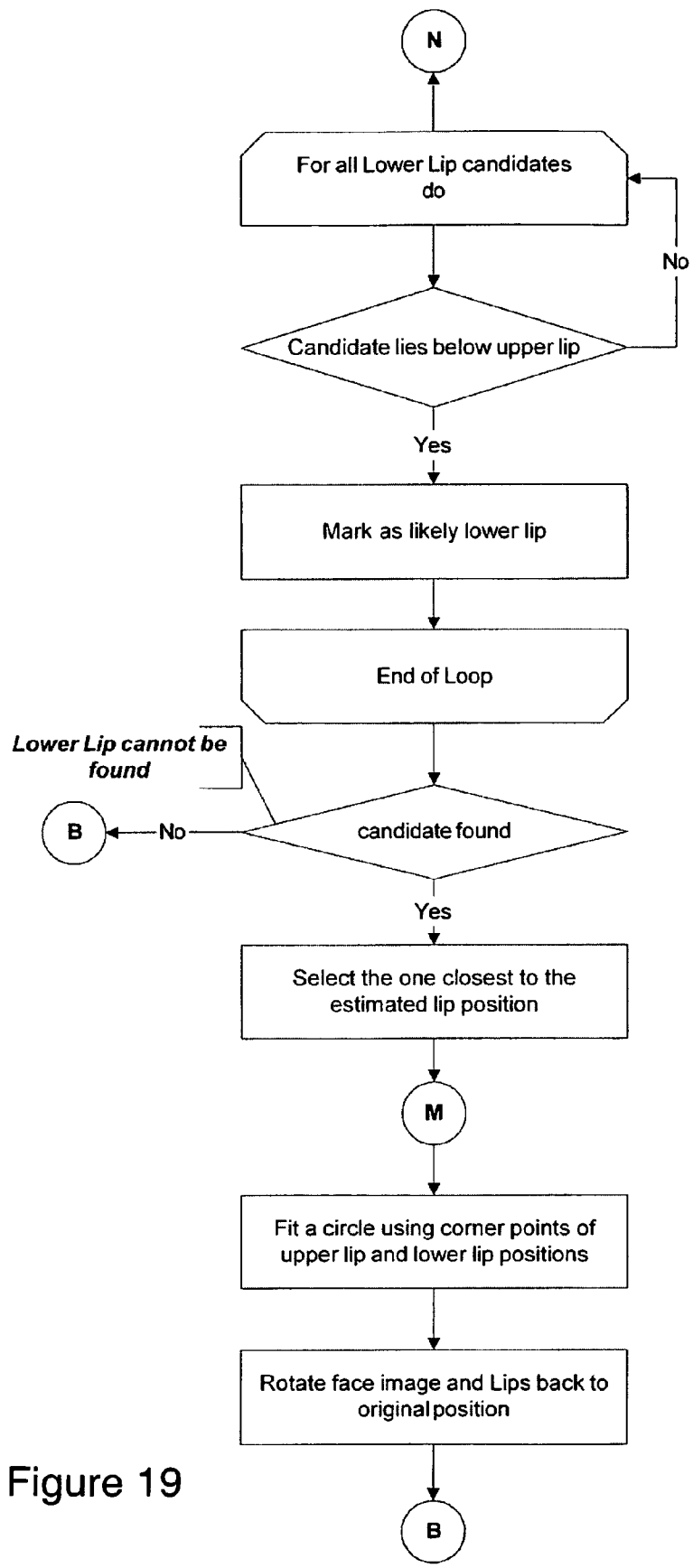

FIG. 19 is a portion of the flow chart for going to the next frame.

Specifically, FIG. 7 starts by getting frames from video data. The first frame is searched, using Haar-like feature based object detection, to attempt to detect a face. If no face is found, the next frame is searched.

If, however, a face is found, the tilt angle of the face is determined. This is done selecting a narrow, vertical strip of the face. The strip is selected in such a way that the strip includes a portion of an eye as well as a portion of the lips.

The strip is vertically "flipped." Using the original and "flipped" images, and relying on the apparent symmetry of the face. The correlations of the original strip with all possible strips on the left side of the face are calculated, and the strip having the highest correlation is selected. A "tilt angle" is then calculated using the angle between (1) a line connecting the center points of the two strips, and (2) the horizontal.

FIG. 8 illustrates rotating the face image rotated by the method of FIG. 7 to make the face "upright." The next step is defining a rectangular search window for the lips in the now upright facial image. The contents of the search window are transformed, and a Sobel Edge Detector is applied to determine horizontal edges. This is a high to low contrast based determination. The Sobel Edge determination is thresholded to discard a major fraction, typically 90 percent, of the pixels.

A connected component labeling follows this.

Next, upper lip candidates are sorted. The candidate lips, that is, connected components, are sorted based on a parameter, as width, and only highest ranking candidates are retained. The search region is restricted to a narrow strip in the middle of the face.

FIG. 9 is a flow chart of the next portion of the algorithm. This portion searches all of the pixels within a set of rows in the search region to find candidates for the upper lip. This can be a brightness, contrast, or chrominance based search. FIG. 10 illustrates the next step of examining upper lip candidates. The first step is selecting a narrow strip window. Next, the Sobel's Edge Determination output is thresholded by one fourth of the maximum value in each row of the strip. Those rows that have been thresholded are then searched, row-by-row, based on the Sobel's Edge Determination for candidate upper lips. Candidate upper lips are identified.

FIG. 11 illustrates the next step of the process, selecting the starting points of the lips for lip edge following. For all candidate upper lips a central narrow strip on the thresholded binary image is selected. The image is then searched from both sides towards the center for a strong edge. If strong edges are found the points associated with the strong edges are selected to be the starting points for edge following.

If, however, strong edges are not found a strategy of considering a central narrow strip is considered from the left and right, and points of maximum response are determined considering edge direction. In either case, a start point is assigned to a current traversal point.

FIG. 12 illustrates the next element, finding the maximum edge strengths. In the first part, while the current traversal point (defined as the neighbor having the largest edge strength) is with the lip window, the edge strengths of three neighbors are computed. The edge strength is determined along a perpendicular to the edge direction, subject to the restriction that two consecutive moves should not select upward neighbors. This process is carried out for both left and right directions.

The resulting contours are then used, as shown in the flow chart of FIG. 13, to select points where upper lip high edge response is found, these points are set as new end points, the upper lip parameters are updated, and a weight is assigned to the parameters as a function of the length of the upper lip. This is done by traversing the image using a Sobel's edge method.

FIG. 14 finishes the search for the upper lip and begins the search for the lower lip. Specifically, FIG. 14 illustrates searching from among upper lip candidates that extend below a certain height, the ones with the maximum weight, and doing a statistical smoothing of the contours of the selected upper lip.

FIG. 14 next illustrates the lower lip search. The contents of the search window are transformed, and a Sobel Edge Detector is applied to determine horizontal edges. As with the upper lip, this is a high to low contrast based determination. The Sobel Edge determination is thresholded to discard a major fraction, typically 90 percent, of the pixels.

This is followed by a connected component labeling.

Next, upper lip candidates are sorted. The candidate lips, that is, connected components, are sorted based on a parameter, as width, and only highest ranking candidates are retained. The search region is restricted to a narrow strip in the middle of the face.

FIG. 15 is a flow chart of the next portion of the algorithm for the lower lip. This portion searches all of the pixels within a set of rows in the search region to find candidates for the lower lip. This can be a brightness, contrast, or chrominance based search. FIG. 15 illustrates the next step of examining lower lip candidates. The first step is calculating the average grey values on the upper rows of the lower lip image. The row having the minimum average value is selected as the candidate for the lower lip.

The next step is for each lower lip candidate, selecting a narrow strip window, and searching for the points of maximum response, from the left and right. That is, for all candidate lower lips a central narrow strip on the image is selected. The image is then searched from both sides towards the center for a strong edge. If strong edges are found the points associated with the strong edges are selected to be the starting points for edge following.

If, however, strong edges are not found a strategy of considering a central narrow strip is considered from the left and right, and points of maximum response are determined considering edge direction. In either case, a start point is assigned to a current traversal point.

FIG. 16 illustrates the next element, finding the maximum edge strengths. In the first part, while the current traversal point (defined as the neighbor having the largest edge strength) is with the lip window, the edge strengths of three neighbors are computed. The edge strength is determined along a perpendicular to the edge direction, subject to the restriction that two consecutive moves should not select upward neighbors. This process is carried out for both left and right directions.

The resulting contours are then used, as shown in the flow chart of FIG. 17, to select points where lower lip height is within maxima and minima, within an acceptable limit from the upper lip, and below the start position of the lower lip (based on the upper lip).

As shown in the portion of the flow chart illustrated in FIG. 18, the candidate lower lips are then searched based on such parameters as the acceptable position depending on the upper lip, and based on upper lip position, selecting a lower lip that is closest estimated lip position.

FIG. 19 finishes the search for the lower lip. Specifically, FIG. 19 illustrates searching from among lower lip candidates in the closest estimated position below the upper lip, finding the lower lip closest to the estimated lip position, fitting a circle using corner points of upper and lower lip positions, rotating the face image and lips back to the original position, and fetching the next frame.

To be noted is that the comparison of all candidate lips contours and movements typically utilizes an 8 pixel by 8 pixel MPEG motion detector. This 8 pixel by 8 pixel MPEG motion detector receives 8 pixel by 8 pixel lip contours and creates motion vectors that are used to characterize the motion. Preferably the two lowest frequency motion vectors are used for motion estimation and Muev characterization. Of course, for other types of video events and video motion, higher frequencies may be used.

The total sequence illustrated in FIGS. 5 through 19 is one example of how visual Muevs are detected and characterized for correlation with audio Muevs.

The invention may find use in industries other than the entertainment industry, such as in industry and commerce where video information is utilized along with associated information, for example in a manufacturing where a video image of a production line accompanies data from a bar code reader which identifies serial numbers of the imaged products. Another example is in transportation where a video image of trucks or freight cars accompanies data from weight or speed measurement. As yet another example of an application for the present invention consider an automated bank teller where video of the customer, audio of the customer's interaction with the teller and data relating to the transaction are all desired to be transmitted to a security site and stored for future access. It is desirable to ensure the proper timing and relationships of these signals are maintained. It will be understood that it is generally desirable to maintain synchronization between such video images and associated signals. In other instances it is desirable to match video data to such associated signals when the identification which would otherwise relate associated signals has been lost, corrupted or is otherwise unavailable or unusable.

The invention may be implemented, for example, by having the various means of receiving video signals and associated signals, identifying Muevs (mutual events) and comparing video signal and associated signal Muevs to determine relative timing as a software application (as an operating system element), a dedicated processor, or a dedicated processor with dedicated code. The software executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for receiving video signals and associated signals, identifying Muevs (mutual events) and comparing video signal and associated signal Muevs to determine relative timing.

This signal-bearing medium may comprise, for example, memory in server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++".

Additionally, the program code may, for example, be compressed, encrypted, or both, and may include executable files, script files and wizards for installation, as in Zip files and cab files. As used herein the term machine-readable instructions or code residing in or on signal-bearing media include all of the above means of delivery.

While the invention has been described in the preferred embodiment with various features and functions herein by way of example, the person of ordinary skill in the art will recognize that the invention may be utilized in various other embodiments and configurations and in particular may be adapted to provide desired operation with preferred inputs and outputs without departing from the spirit and scope of the invention.

The invention claimed is:

1. A method for determining the relative timing of a sequence of images and associated information comprising the steps of:
    a) receiving image information conveying a plurality of images,
    b) determining an edge, in one of said plurality of images, that exceeds a preset threshold and defining a contour of an area of one of said plurality of images in response thereto,
    c) identifying image mutual events in response to said area,
    d) receiving associated information,
    e) identifying associated mutual events in said associated information,
    f) comparing said image mutual events and said associated mutual events to determine the relative timing therebetween.

2. The method of claim 1 wherein said receiving associated information includes receiving audio information.

3. The method of claim 1 wherein the image information is received via one of the group consisting of video, video files, video clips, and video data.

4. The method of claim 2 wherein the audio mutual event is a change of at least 30 percent in the audio envelope or a change in the average frequency in the audio signal.

5. The method of claim 2 comprising receiving audio information as associated information.

6. The method of claim 1, in which the image edge detection is thresholded to discard a major fraction of the image pixels.

7. A method for determining the relative timing of a video signal conveying a plurality of images and an associated audio signal comprising in combination:
    a) receiving said video signal;
    b) determining an image edge that exceeds a preset limit in said video signal and defining a contour within a portion of one of said plurality of images in response thereto;
    c) identifying video mutual events in response to said portion;
    d) receiving said associated audio signal;
    e) identifying audio mutual events in said audio signal; and
    f) comparing said video mutual events and said audio mutual events to determine the relative timing therebetween.

8. The method of claim 7 wherein the video signal is received via one of the group consisting of video, video files, video clips, and video data.

9. The method of claim 7 wherein the audio mutual event is a change of at least 30 percent in the audio envelope or a change in the average frequency in the audio signal.

10. The method of claim 7, in which the image edge detection is thresholded to discard a major fraction of the image pixels.

11. A method for synchronizing a video signal conveying a plurality of images and an associated audio signal, said method comprising:
    a) receiving said video signal;
    b) searching for a face in a frame of the video signal;
    c) if a face is not found in the frame, going to a next frame;
    d) if a face is found, detecting a lip in the face, and finding the face and lip window in the frame;
    e) determining what lip edges in said face and lip window exceed a preset threshold, and defining the contours of such lip edges;
    f) identifying video mutual events in the movements of the lips in said video signal;
    g) receiving said associated audio signal;
    h) identifying audio mutual events in said audio signal; and
    i) comparing said video mutual events and said audio mutual events to determine the relative timing therebetween.

12. The method of claim 11 wherein steps "d", "e" and "f", detecting a lip in the face, and defining the face and lip contour in the face and lip window in the frame further comprises:
    a) selecting a first area of the face that includes a portion of an eye and of the lips;
    b) vertically flipping the selected area and calculating a correlation of the area and areas on the opposite side of the face;
    c) selecting a second area on the opposite side of the face that has the highest correlation with the first area;
    d) defining a search area for the lips;
    e) determine what edges in said search area exceed a preset threshold, and defining the contours of such search area edges;
    f) isolate the shape of the lips; and
    g) determine the curl of the lips.

13. The method of claim 12 comprising correlating a sequence of lip curls with words to identify video mutual events in the images of the video signal.

14. The method of claim 11, in which the image edge detection is thresholded to discard a major fraction of the image pixels.

15. A program product comprising a machine-readable data storage medium, including at least one of a hard drive, RAID array, RAMAC, magnetic data storage diskette, magnetic tape, digital optical tape, RAM, ROM, EPROM EEPROM, flash memory, and magneto-optical storage, encoded with program code for a method of synchronizing a video signal conveying a plurality of images and an associated audio signal, said method comprising:
    a) receiving said video signal;
    b) searching for a face in a frame of the video signal;
    c) if a face is not found in the frame, going to a next frame;
    d) if a face is found, detecting a lip in the face, and finding the face and lip window in the frame;

e) determining what lip edges in said face and lip window exceed a preset threshold, and defining the contours of such lip edges;
f) identifying video mutual events in the movements of the lips in said video signal;
g) receiving said associated audio signal;
h) identifying audio mutual events in said audio signal; and
i) comparing said video mutual events and said audio mutual events to determine the relative timing therebetween.

16. The program product of claim 15 wherein steps "d", "e" and "f", detecting a lip in the face, and finding the face and lip contour in the face and lip window in the frame further comprises:
a) selecting a first area of the face that includes a portion of an eye and of the lips;
b) vertically flipping the selected area and calculating a correlation of the area and areas on the opposite side of the face;
c) selecting a second area on the opposite side of the face that has the highest correlation with the first area;
d) defining a search area for the lips;
e) determining what edges in the lip search area exceed a preset threshold, and defining the contours of such lip edges;
f) isolate the shape of the lips; and
g) determine the curl of the lips.

17. The program product of claim 16 wherein the method comprises correlating a sequence of lip curls with words to identify video mutual events in the images of the video signal.

18. The program product of claim 16, wherein said edges are determined by a Sobel edge detector algorithm.

19. The program product of claim 15, wherein the movements of the lips are determined by an 8 pixel by 8 pixel MPEG motion detector.

20. The program product of claim 15, in which the image edge detection is thresholded to discard a major fraction of the image pixels.

21. A method for determining the relative timing of a sequence of images and associated information comprising the steps of:
a) receiving image information conveying a plurality of images;
b) determining what image edges in said plurality of images exceed a preset threshold;
c) identifying image mutual events in response to temporal changes in image edges of said image information;
d) receiving associated information;
e) identifying associated mutual events in said associated information; and
f) comparing said image mutual events and said associated mutual events to determine the relative timing therebetween.

22. The method of claim 21, in which the image edge detection is thresholded to discard a major fraction of the image pixels.

23. A method for determining the relative timing of a sequence of images and associated information comprising the steps of:
a) receiving image information conveying a plurality of images;
b) determining what Sobel edges in said plurality of images exceed a preset threshold;
c) identifying image mutual events in image edges of said image information;
d) receiving associated information;
e) identifying associated mutual events in said associated information; and
f) comparing said image mutual events and said associated mutual events to determine the relative timing therebetween.

24. The method of claim 23, in which the Sobel edge detection is thresholded to discard a major fraction of the image pixels.

25. A method for synchronizing a video signal conveying a plurality of images and an associated audio signal, said method comprising:
a) receiving said video signal;
b) searching for a face in a frame of the video signal;
c) if a face is not found in the frame, going to a next frame;
d) if a face is found, detecting a lip in the face, and finding the face and lip;
e) determining what lip edges in said face and lip exceed a preset threshold, defining the contours of such lip edges, and determining the shape of the lips;
f) identifying video mutual events in the shape and the movement of the lips over a sequence of frames;
g) receiving said associated audio signal;
h) identifying audio mutual events in said audio signal; and
i) comparing said video mutual events and said audio mutual events to determine the relative timing therebetween.

26. The method of claim 25, in which the video mutual events are statistically identified with speech patterns which are used as audio mutual events.

* * * * *